(12) United States Patent
Sterling (10) Patent No.: US 12,460,435 B1
(45) Date of Patent: Nov. 4, 2025

(54) LEVELING DEVICE

(71) Applicant: Monte Sterling, Bozeman, MT (US)

(72) Inventor: Monte Sterling, Bozeman, MT (US)

(*) Notice: Subject to any disclaimer, the term of this patent is extended or adjusted under 35 U.S.C. 154(b) by 379 days.

(21) Appl. No.: 17/897,504

(22) Filed: Aug. 29, 2022

Related U.S. Application Data (60) Provisional application No. 63/237,691, filed on Aug. 27, 2021.

(51) Int. Cl.
*E04G 21/18* (2006.01)
*E04G 21/26* (2006.01)

(52) U.S. Cl.
CPC ......... *E04G 21/1841* (2013.01); *E04G 21/26* (2013.01)

(58) Field of Classification Search
CPC ..... B25G 1/04; B66F 7/0641; E04G 21/1841; E04G 21/26; B25H 1/0035
USPC ........ 254/113, 114, 116, 119, 120, 123, 127, 254/133 A; 248/354.1, 354.4, 354.6, 248/354.7
See application file for complete search history.

(56) References Cited

U.S. PATENT DOCUMENTS

| | | | |
|---|---|---|---|
| 1,776,579 A * | 9/1930 | Countryman | G05G 5/06 254/114 |
| 1,890,966 A * | 12/1932 | Bullis | E04G 25/08 254/114 |
| 3,574,981 A | 4/1971 | Henschen | |
| 4,070,833 A | 1/1978 | Hancock | |
| 4,420,921 A | 12/1983 | Hardin | |
| 4,753,426 A | 6/1988 | Varkala | |
| 4,822,487 A * | 4/1989 | Soich | E04H 4/1609 210/241 |
| 4,870,741 A | 10/1989 | Hansmann | |
| 4,944,123 A | 7/1990 | Larrieu | |
| 4,987,043 A | 1/1991 | Love | |
| 5,114,127 A | 5/1992 | Everhart | |
| 5,622,354 A | 4/1997 | Chagnot | |
| D414,678 S | 10/1999 | Sanders | |
| 6,000,898 A | 12/1999 | Sharp | |
| 6,308,467 B1 | 10/2001 | Timility | |
| 7,665,252 B2 | 2/2010 | Lang | |
| 9,109,892 B2 | 8/2015 | Carbajal | |
| 2006/0080937 A1 | 4/2006 | Jones | |
| 2007/0175174 A1 | 8/2007 | Bruno | |

(Continued)

*Primary Examiner* — Tyrone V Hall, Jr.
(74) *Attorney, Agent, or Firm* — John Rizvi; John Rizvi, P.A.—The Patent Professor®

(57) ABSTRACT

A leveling device which can be selectively deployed and actuated to raise, lift, or stabilize a structural member or other element with respect to a support surface. In some embodiments, the leveling device may include an extendable device frame. The device frame may be selectively extendable to various lengths. A frame extension assembly may operably engage the device frame. The frame extension assembly may be configured to facilitate selective extension or lengthening and retraction or shortening of the device frame. The device frame may be selectively lockable at the selected extended length. In application of the device, the device frame may be deployed in place between a floor or other support surface and an elevated structural member to be raised, leveled, or stabilized. The frame extension assembly may be deployed from the pre-extended position to the extended position to extend the device frame and raise, level or stabilize the structural member.

17 Claims, 8 Drawing Sheets

(56) References Cited

U.S. PATENT DOCUMENTS

2008/0141598 A1 6/2008 Cook
2008/0184578 A1 8/2008 O'Brien

* cited by examiner

LEVELING DEVICE

CROSS-REFERENCE TO RELATED APPLICATIONS

This application claims the benefit of U.S. Provisional Patent Application No. 63/237,691, filed on Aug. 27, 2021, which is incorporated by reference herein in its entirety.

FIELD OF THE INVENTION

The present invention relates generally to construction tools and devices, and more particularly, to a leveling device which can be selectively deployed and actuated to raise, lift, or stabilize a structural member or other element with respect to a support surface.

BACKGROUND OF THE INVENTION

In the construction of buildings, elevated structural members such as walls, ceiling panels, roof panels and the like may be prefabricated at the construction site. The structural members may be fabricated in a horizontal orientation or in a flat position on a level surface such as the subfloor of the building. After fabrication is complete, the structural member may be raised or lifted and then secured.

Fabrication of some structures such as, but not limited to, walls, beams or columns, may require the use of structure forms of wood, steel, aluminum, or combinations thereof, for example. The structure forms may form a barrier for poured concrete, which is then poured to form the structure. Once the concrete structure is formed, the structure forms may be stripped down and moved to a separate location where another concrete structure is formed. Structure forms may be heavy and require sturdy braces or leveling devices for support. In some cases, wooden devices may be deployed to support the structure form in place during pouring of the concrete.

Bracing and leveling devices commonly used to support structure forms may have weak points at several positions. Many wooden devices are heavy and cumbersome to adjust and may require complete removal from the structure forms each time the structure form requires moving. Some job sites may lack sufficient storage space for the devices. Thus, the devices may tend to get in the way or require frequent moving when not being used. Furthermore, frequent moving of the devices may be quite labor intensive.

In many construction projects, walls of a building may be prefabricated prior to installation. A prefabricated wall may be quite heavy. Lifting of the wall, therefore, may require many workers. In the case of injury to any of the workers, costs for injury claims may be costly. Therefore, it may be beneficial for the need to use workmen to raise prefabricated walls as sparingly as possible.

Until it is permanently supported, a prefabricated wall may be unstable and tend to fall. In some cases, wind loads may increase the instability of the wall. Thus, devices may be deployed to support the wall until the wall is stable. Many devices used for the purpose, however, may be cumbersome and heavy. Some types of devices may only be adjustable to support walls that are a certain height. Others may require special equipment or multiple persons to install as well as extra space for storage.

Conventional bracing and leveling devices may be available in specific sizes and inflexible for use. Thus, it may be necessary for contractors to utilize devices having different lengths for structural members at different heights. The devices may be suitable to install only after construction of the structural member. Furthermore, some devices may be too long and cumbersome for ease of transport.

Accordingly, a more versatile leveling device is desired, which may solve at least one of the aforementioned problems. For example, a leveling device which can be selectively deployed and actuated to raise, lift, or stabilize a structural member or other element with respect to a support surface, and is also height-adjustable, may be desirable for some applications.

SUMMARY OF THE INVENTION

The present invention is directed to a leveling device which can be selectively deployed and actuated to raise, lift, or stabilize a structural member or other element with respect to a support surface. In some embodiments, the leveling device may include an extendable device frame. The device frame may be selectively extendable to various lengths. A frame extension assembly may operably engage the device frame. The frame extension assembly may be configured to facilitate selective extension or lengthening and retraction or shortening of the device frame. The device frame may be selectively lockable at the selected extended length. In application of the device, the device frame may be deployed in place between a floor or other support surface and an elevated structural member to be raised, leveled, or stabilized. The frame extension assembly may be deployed from the pre-extended position to the extended position to extend the device frame and raise, level, or stabilize the structural member.

In an illustrative implementation of the invention, a leveling device which can be selectively deployed and actuated to raise, lift, or stabilize a structural member or other element with respect to a support surface may include an extendable device frame. The device frame may be selectively extendable to various lengths. A manually-actuatable frame extension assembly may operably engage the device frame. The frame extension assembly may be selectively deployable from a pre-extended position to an extended position and configured to facilitate selective extension or lengthening or retraction and shortening of the device frame. A frame lock may operably engage the device frame. The frame lock may be configured to selectively lock the device frame at the selected extended length. In application of the device, the device frame may be deployed in place between a floor or other support surface and an elevated structural member to be raised, leveled, or stabilized. The frame extension assembly may be deployed from the pre-extended position to the extended position to extend the device frame and raise, level or stabilize the structural member. The frame lock may be deployed to lock the device frame at the selected extended length.

In another implementation of the invention, a leveling device selectively deployable and actuatable to raise, lift, or stabilize a structural member with respect to a support surface, may include a device frame. The device frame may include a first frame member and a second frame member. The second frame member may slidably and adjustably overlap with the first frame member such that a protruding portion of the second frame member extends beyond the first frame member. The device frame may be selectively extendable to various lengths by adjusting an overlap between the first and second frame members to vary a length of the protruding portion. The leveling device may further include a lever-actuated, frame extension assembly operably engaging the first frame member and the second frame member of the device frame. The frame extension assembly may be configured to facilitate selective adjustment of the overlap between the first and second frame members of the device frame to adjust the length of the protruding portion and thereby adjust the device frame to a selected extended length. The leveling device may be further provided with a frame lock configured to lock the device frame at the selected extended length.

In a second aspect, the first and second frame members may be elongately formed and straight.

In another aspect, the frame extension assembly may include a lever. The lever may be pivotably connected to the first and second frame members about first and second pivot points defining first and second rotation axes, respectively. The second rotation axis may be spaced apart from and parallel to the first rotation axis. The second frame member may be slidable relative to the first frame member responsively to a pivoting of the lever about the first rotation axis.

In another aspect, the lever may include a handle. The second rotation axis may be arranged between the handle and the first rotation axis.

In another aspect, the lever may be length-adjustable.

In yet another aspect, the leveling device may further include a bracket affixed to the first frame member at an end of the first frame member from which the second frame member protrudes. The bracket may be configured to retain the second frame member adjacent and slidable relative to the first frame member.

In another aspect, the bracket may include a fastener arranged in spaced-apart configuration with the first frame member. The second frame member may be slidably received between the fastener and the first frame member.

In another aspect, the frame lock may include a lock collar and an elongated flexible element. The lock collar may be slidable over and along the protruding portion of the second frame member. The elongated flexible element may extend from the lock collar to the frame extension assembly. The leveling device may be configured to selectively adopt an unlocked configuration and a locked configuration. In the unlocked configuration, the lock collar may be arranged in a first position relative to the second frame member such that the lock collar is slidable along the second frame member; the elongated flexible element may be non-taut. In the locked configuration, the lock collar may be arranged in a second position relative to the second frame member such that the lock collar frictions against and is non-slidable relative to the second frame member, the elongated flexible element may be taut.

In another aspect, with the elongated flexible member non-taut, the lock collar may be manually movable from the second position to the first position.

In yet another aspect, the elongated flexible element may extend from the lock collar to the lever, and may be slidable relative to the first frame member responsively to a pivoting of the lever about the first rotation axis.

In another aspect, the lever in the locked configuration may be pivoted to a lowered position relative to a raised position of the lever the unlocked configuration and may be maintained in the lowered position by the taut, flexible element pulling on the lever and counteracting the force of gravity exerted on the lever.

In another aspect, the lever may be movable from the lowered position to the raised position by manually operating the lever.

In another aspect, the leveling device may further include a bracket affixed to the first frame member and located between the first rotation axis and the lock collar. The bracket may be configured to retain the second frame member adjacent and slidable relative to the first frame member.

In yet another aspect, the lock collar may be pivotable relative to the second frame member and positionable in the second position by a torque applied on the lock collar by a pulling of the elongated flexible element on the lock collar.

In another aspect, the lock collar may include a shaft extending therethrough generally transverse to the second frame member. The frame member may slidably extend through the lock collar on a first side of the shaft. The elongated flexible element may be connected to and configured to pull on the lock collar at a second side of the shaft opposite the first side. The lock collar may be pivotable relative to the second frame member about the shaft.

In another aspect, in the locked configuration, an inner side of the lock collar may bite into an outer side of the second frame member.

In another aspect, in the unlocked configuration, the inner side of the lock collar may be arranged generally parallel to the outer side of the second frame member.

In yet another aspect, the leveling device may further include a frame base configured to support the first frame member on the support surface.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a leveling device which can be selectively deployed and actuated to raise, lift, or stabilize a structural member or other element with respect to a support surface.

Figure 1:
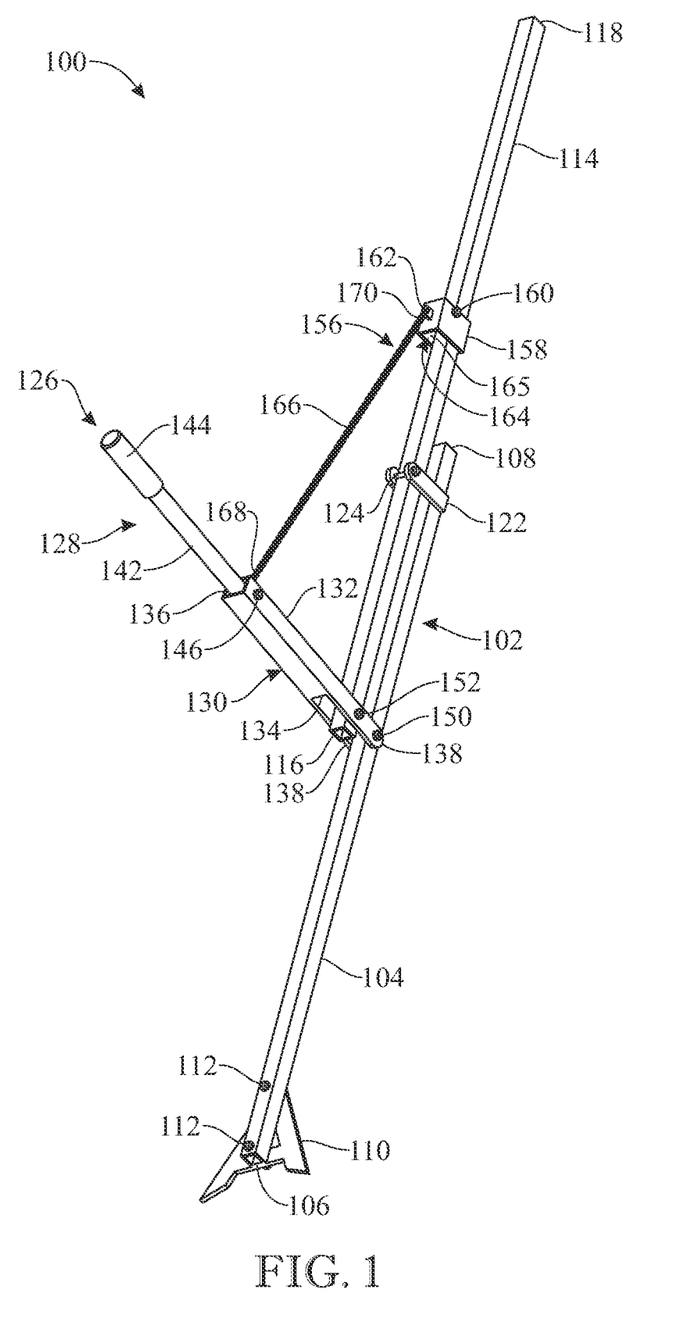
FIG. 1 presents a bottom, front perspective view of a leveling device in accordance with an illustrative embodiment of the present invention.
Figure 2:
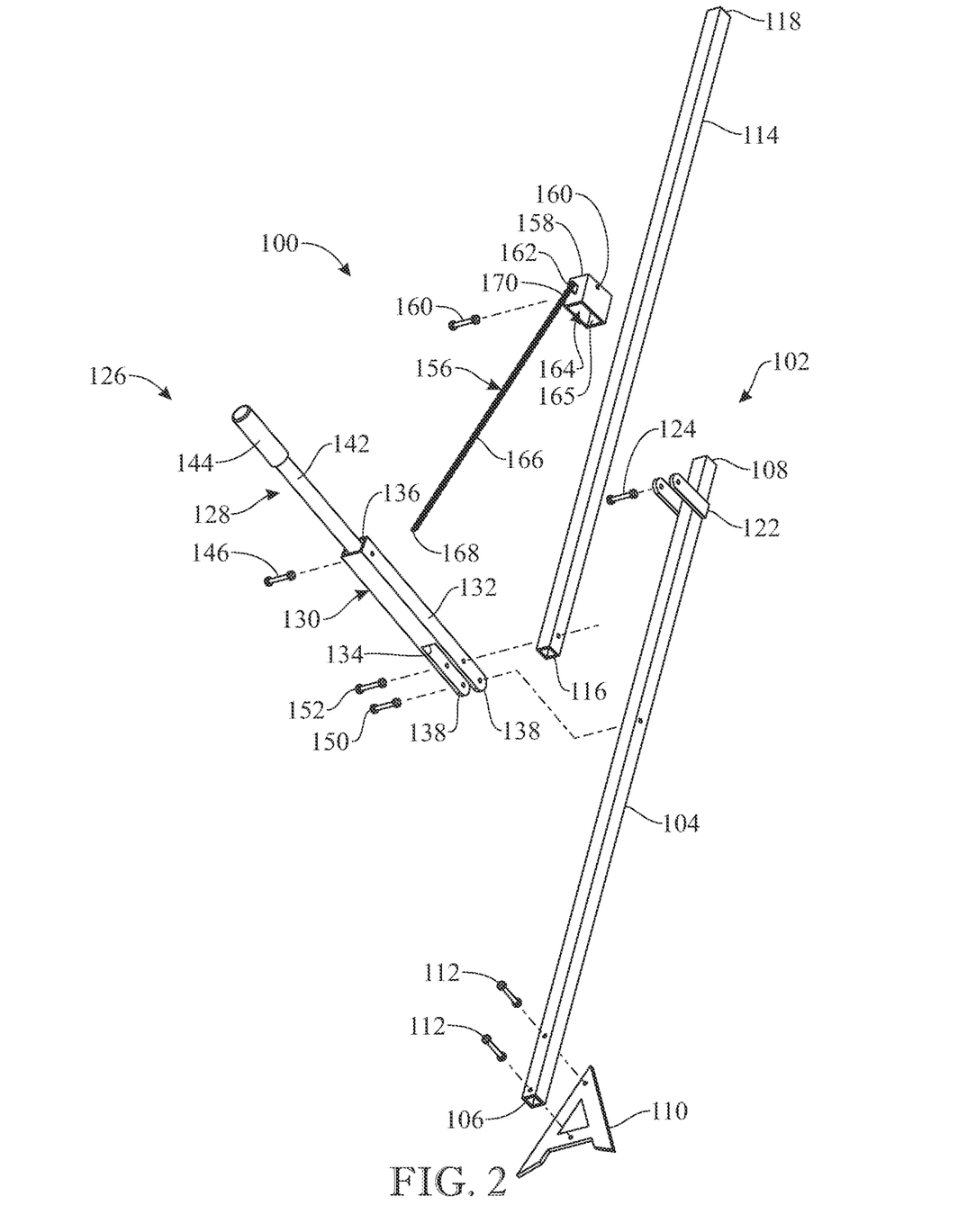
FIG. 2 presents a bottom, front exploded perspective view of the leveling device illustrated in FIG. 1.
Figure 3:
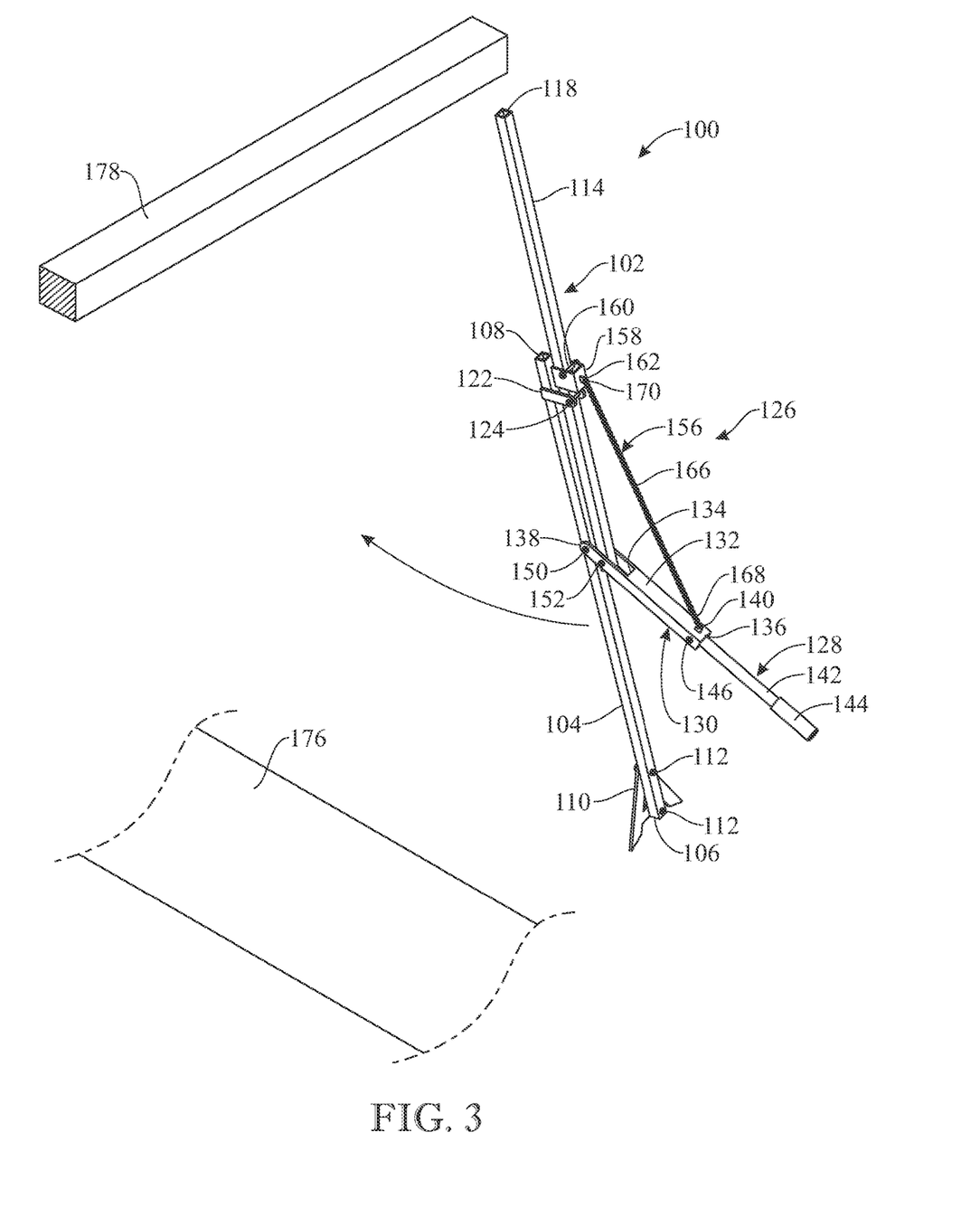
FIG. 3 presents a top, front perspective view illustrating deployment of the leveling device in place between a support surface and a structural member to be lifted or stabilized in application of the leveling device.
Figure 4:
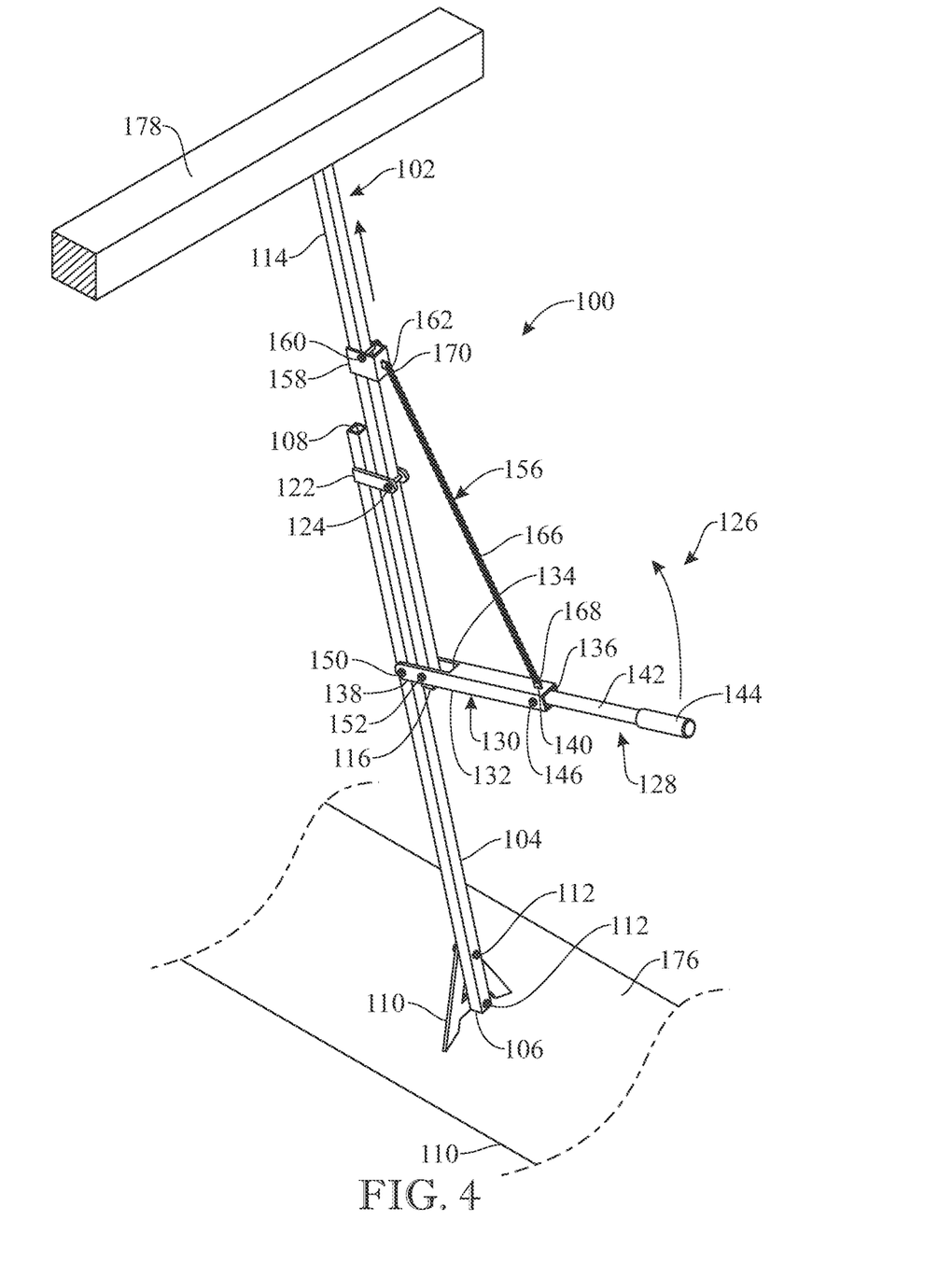
FIG. 4 presents a top, front perspective view of the leveling device deployed in place, more particularly illustrating actuation of the frame extension assembly to raise, lift or stabilize the structural member.

The illustrations of FIGS. 1-9 depict a leveling device 100 for deployment between a support surface 176 and an elevated structural member 178 to raise, lift or stabilize the structural member 178, as shown in FIG. 4, in accordance with an exemplary embodiment of the present invention. With reference initially to FIG. 1, the leveling device 100 may include an elongated, extendable device body or frame 102. The device frame 102 may be selectively extendable to various lengths. A frame extension assembly 126 may operably engage the device frame 102. The frame extension assembly 126 may be configured to facilitate selective extension or lengthening, and retraction or shortening, of the device frame 102. The device frame 102 may be selectively lockable at the selected extended length. As illustrated in FIGS. 3 and 4, in application of the leveling device 100, the device frame 102 may be deployed in place between the floor or other support surface 176 and the elevated structural member 178 to be raised, leveled, or stabilized. The frame extension assembly 126 may be deployed from a pre-extended position (FIG. 3) to an extended position (FIG. 4) to extend the device frame 102 and raise, level, or stabilize the structural member 178.

In some applications of the leveling device 100, a frame lock 156 may operably engage the device frame 102. The frame lock 156 may be configured to selectively lock the device frame 102 at the selected extended length of the variety of selectable lengths.

The device frame 102 may include a first frame member 104. A second frame member 114 may be slidably disposed with respect to the first frame member 104 along a generally axial or longitudinal direction of the first and second frame members 104, 114. A bracket 122 may attach the second frame member 114 to the first frame member 104, such that the second frame member 114 may slide through the bracket 122 and relative to the first frame member 104. In some embodiments, the bracket 122 may be fixed with respect to the first frame member 104. As illustrated in FIG. 2, the second frame member 114 may be slidably disposed with respect to the bracket 122. A fastener 124 may be arranged outward of the second frame member 114 and may extend across the bracket 122, such that the bracket 122 and fastener 124 slidably retain the second frame member 114 between the fastener 124 and the first frame member 104.

A frame base 110 may be provided on the first frame member 104 of the device frame 102. The frame base 110 may be configured to support the first frame member 104 on the support surface 176, as illustrated in FIG. 4. For example, the frame base 110 may be wider than the first frame member 104 in at least one direction; in the non-limiting example shown in the drawings, for instance, the frame base 110 is wider than the first frame member 104 along a left-to-right or transverse direction of the leveling device 100, providing lateral stability. Furthermore, the present frame base 110 is generally flat and configured to contact the support surface 176 along relatively narrow contact surface or edge which provides a rotation axis, enabling a forward and rearward oscillation or pivoting of the leveling device 100 relative to the support surface 176 facilitating installation and removal of the leveling device 100.

The first frame member 104 of the device frame 102 may be elongated, and formed as a tube, pole, post, rod, or the like, with a lower end 106 and an upper end 108. The frame base 110 may be provided at the lower end 106. The bracket 122 may be provided at or proximate the upper end 108.

The frame base 110 may be permanently or disconnectably attached to the first frame member 104 of the device frame 102. For example, as illustrated in FIG. 2, in some embodiments, at least one frame base fastener 112 may attach the frame base 110 to the first frame member 104. In some embodiments, the frame base 110 may be attached to the first frame member 104 via brackets, flanges, welding and/or other suitable attachment techniques known by those skilled in the art.

The second frame member 114 of the device frame 102 may be elongated, and formed as a tube, pole, post, rod, or the like, similarly to the first frame member 104. For instance, in a non-limiting embodiment, the first and second frame members 104 and 114 may be formed as hollow, rectangular aluminum extrusion tubes, which lead to a lightweight yet robust device. The second frame member 114 may have a lower end 116 an upper end 118, and may overlap the first frame member 104 between the upper end 108 of the first frame member 104 and the lower end 116 of the second frame member 114. A top portion of the second frame member 114 (the top portion extending from the upper end 108 of the first frame member 104 to the upper end 118 of the second frame member 114) may protrude upward from the first frame member 104. In turn, a bottom portion of the first frame member 104 (the bottom portion extending from the lower end 116 of the second frame member 114 to the lower end 106 of the first frame member 104) may protrude downward from the second frame member 114.

Figure 7:
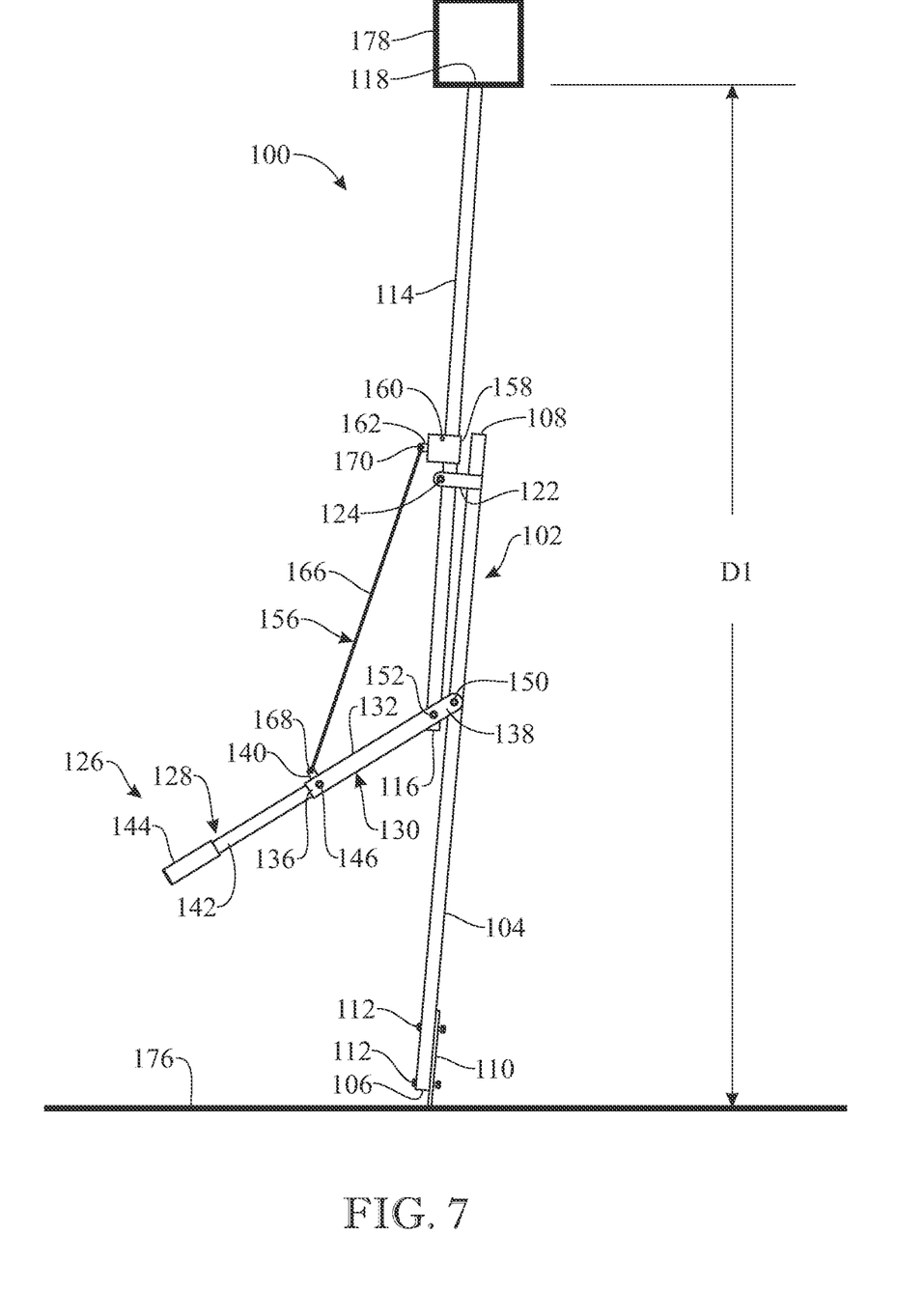
FIG. 7 presents a side elevation view of the leveling device deployed in a first or pre-extended position.
Figure 8:
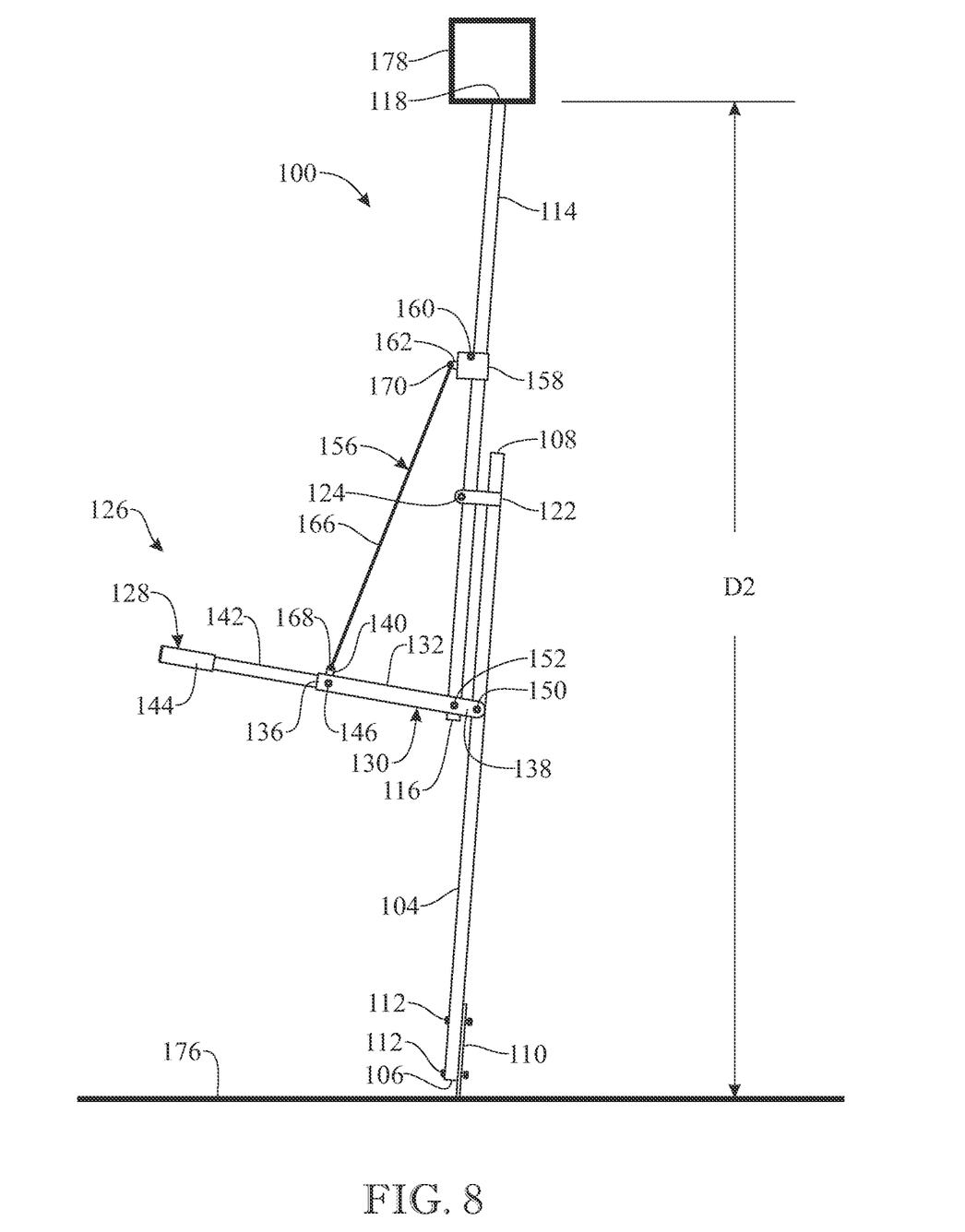
FIG. 8 presents a side elevation view of the leveling device deployed in a second or intermediate position.
Figure 9:
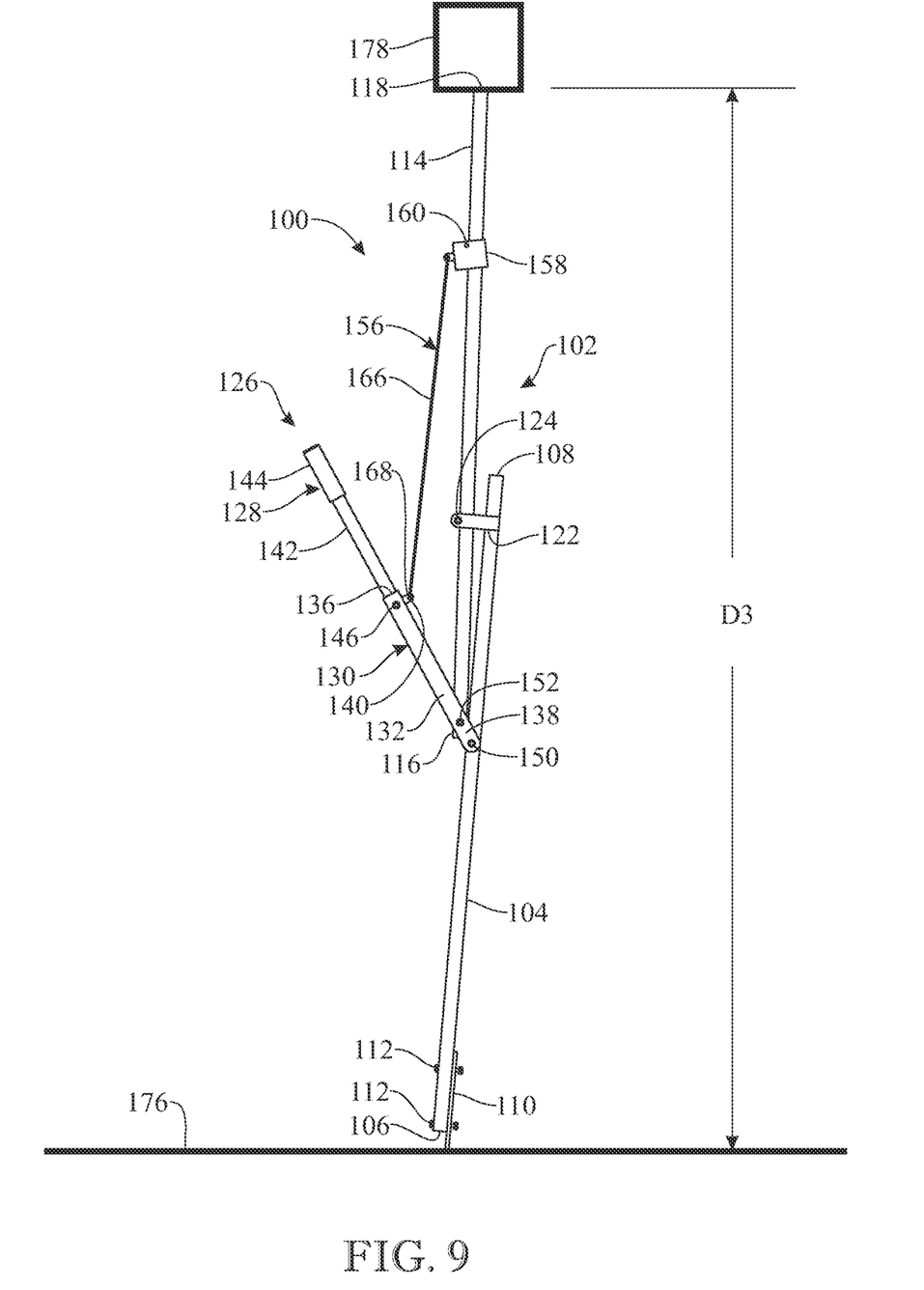
FIG. 9 presents a side elevation view of the leveling device deployed in a third or extended position.

In some embodiments, the frame extension assembly 126 may include a lever 128. The lever 128 may pivotally engage the first frame member 104 and the second frame member 114 of the device frame 102 at different rotation axes. A first pivot fastener 150 may form a first pivot point, and corresponding first rotation axis, of the lever 128 with respect to the first frame member 104. A second pivot fastener 152 may form a second pivot point, and corresponding second rotation axis, of the lever 128 with the second frame member 114. As will be hereinafter further described, the lever 128 can be selectively deployed in different angular positions, such as a downwardly-pivoted, first position illustrated in FIG. 7 in which the second frame member 114 is deployed in a lower position, through an intermediate, second position illustrated in FIG. 8, to a relatively higher, third position shown in FIG. 9, in which the second frame member 114 is deployed in an upper position. As best shown in the sequence of FIGS. 7-9, the lever 128 may pivot with respect to the first pivot fastener 150 and pivotably rise as the first frame member 104 rests on the support surface 176. As the lever 128 pivots and rises about the first pivot fastener 150, the second pivot fastener 152 also pivots about the first pivot fastener 150, thereby elevating the second frame member 114 as the lever 128 pivots with respect to the second frame member 114 at the second pivot fastener 152.

As further shown in FIG. 1, in some embodiments, the lever 128 may include a first lever member 130 which pivotally engages the first frame member 104 and the second frame member 114 of the device frame 102 at the first and second pivot fasteners 150 and 152, and about the first and second rotation axes, respectively, as was heretofore described. The first lever member 130 of the lever 128 may have a main portion 132 ending in a first end 134 and an opposite, second end 136, wherein the first end 134 of the main portion 132 is pivotally attached to the first frame member 104 and the second frame member 114 at the first and second pivot fasteners 150 and 152, respectively. A pair of spaced-apart frame attachment flanges 138 may extend from the first end 134 of the first lever member 130. The first pivot fastener 150 and the second pivot fastener 152 may pivotally attach the frame attachment flanges 138 to the first frame member 104 and the second frame member 114, respectively, of the device frame 102.

With continued reference to FIG. 1, the lever 128 may further include a handle, which may be provided for instance by a second lever member 142 that may extend from the second end 136 of the first lever member 130. In some embodiments, such as the present embodiment, the first and second lever members 130 and 142 may be coaxial and jointly form an elongated, rectilinear lever 128. In some embodiments, the second lever member 142 may be selectively extendable from the first lever member 130 of the lever 128 and lockable in one or more extension positions or lengths via a handle extension pin 146. A grip 144 may be provided on the second lever member 142 of the lever 128, such as to facilitate a non-slip and/or ergonomic grasping of the lever 128.

The frame lock 156 may include a lock collar 158 slidable with respect to and along the second frame member 114 of the device frame 102, and more specifically, slidable along the portion of the second frame member 114 which extends beyond the upper end 108 of the first frame member 104, as best shown in FIG. 1. At least one elongated flexible element 166 may extend from the lock collar 158 to the lever 128. The elongated flexible element 166 of the frame lock 156 may include a chain, cable and/or other elongated flexible member which may deform and is preferably non-stretchable.

As shown in FIGS. 1 and 4, the elongated flexible element 166 of the frame lock 156 may have a first end 168 attached to the lever 128 and a second end 170 attached to the lock collar 158. As shown for instance in FIG. 4, a first flange 140 may attach the first end 168 of the elongated flexible element 166 to the lever 128. In like manner, and as also shown for instance in FIG. 5, a second flange 162 may attach the second end 170 of the elongated flexible element 166 to the lock collar 158.

Figure 5:
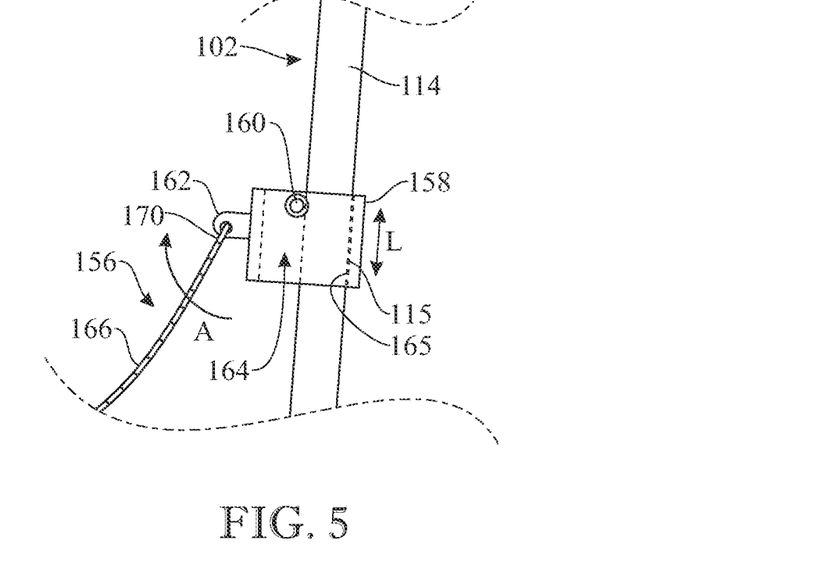
FIG. 5 presents a side elevation view of the second frame member of the device frame of the leveling device and the lock collar of the frame lock on the second frame member, with the frame lock deployed in the unlocked position.
Figure 6:
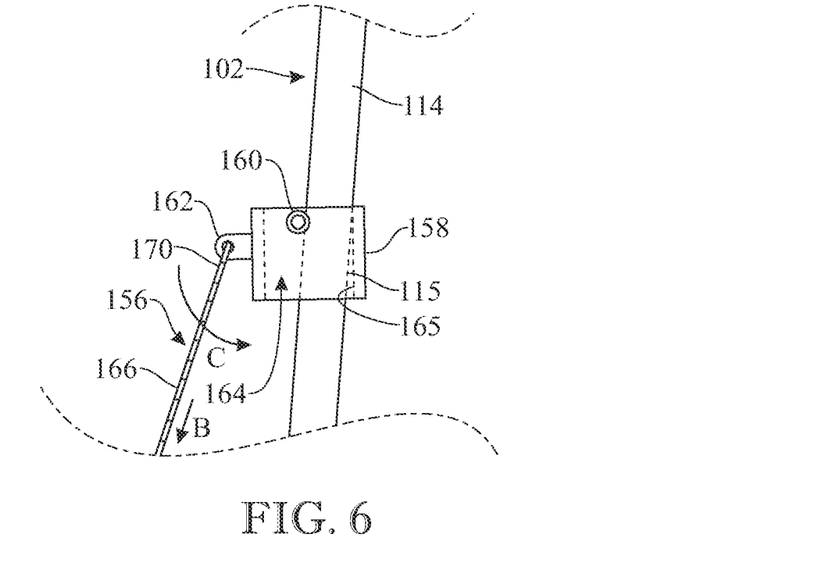
FIG. 6 presents a side elevation view of the second frame member of the device frame of the leveling device and the lock collar on the second frame member, with the frame lock deployed in the locked position.

As illustrated in FIGS. 5 and 6, the lock collar 158 may be formed as a tubular body, or sleeve, which may be generally rectangular or otherwise matching an outer contour of the second frame member 114. An interior space 164 may extend through the lock collar 158 and may receive the second frame member 114 of the device frame 102, such that the second frame member 114 slidably extends through the lock collar 158. A preferably cylindrical fastener, bolt, rod, pin, shaft, or the like, hereinafter referred to generally as shaft 160, may extend through the interior space 164 and transversely across the lock collar 158, and transversely to the axial or longitudinal direction of the elongated, second frame member 114. The shaft 160 may be disposed between the second frame member 114 and the second flange 162 or other attachment point of the elongated flexible element 166 with the lock collar 158.

In some embodiments, such as the present embodiment, the lock collar 158 is switchable between an unlocked position, shown in FIG. 5, and a locked position, shown in FIG. 6, respectively enabling and preventing the sliding of the lock collar 158 along the second frame member 114. Specifically, as shown in FIG. 5, the lock collar 158 may be arranged in a first (or unlocked) position in which an inner wall 165 of the lock collar 158 facing the interior space 164 is arranged generally parallel to an outer side 115 of the second frame member 114 which faces the inner wall 165, preventing or minimizing a friction between the outer side 115 of the second frame member 114 and the inner wall 165, and allowing the second frame member 114 to slide along said inner wall 165 upward and downward as indicated by arrow L. Alternatively, as shown in FIG. 6, the lock collar may be arranged in a second (or locked) position in which said inner wall 165 is arranged non-parallel to the outer side 115 of the second frame member 114 such that an edge of the lock collar 158 abuts against or "bites into" the outer side 115 of the second frame member 114, providing a significant friction between the lock collar 158 and the second frame member 114 such that the lock collar 158 is prevented from sliding along the second frame member 114.

In order to switch the lock collar 158 from the locked position (FIG. 6) to the unlocked position (FIG. 5), the operator of the leveling device 100 may slightly pivot the lever 128 (FIG. 1) upward about the first pivot fastener 150 to allow the elongated flexible element 166 to lose tension and then may manually shift the lock collar 158 upward, as indicated by arrow A (FIG. 5), to position the inner wall 165 parallel to the outer side 115 of the second frame member 114. In some embodiments, such as the present embodiment, the lock collar 158 may include the aforementioned shaft 160 and the shifting may be facilitated by said shaft 160; specifically, the operator may push the lock collar 158 upward at the side of the lock collar 158 at which the second end 170 of the elongated flexible element 166 connects to the lock collar 158, causing the lock collar 158 to pivot upward and about the shaft 160 in the direction of arrow A and thereby causing the inner wall 165 to become parallel to the second frame member 114.

Conversely, in order to switch the lock collar 158 from the unlocked position (FIG. 5) to the locked position (FIG. 6), the operator may simply let go of the lever 128, which will then pivot downward due to gravity, causing the elongated flexible element 166 to become tensioned and thereby pull on the lock collar 158 (via the second flange 162) as indicated by arrow B. The pulling of the elongated flexible element 166 causes the lock collar 158 to shift downward in the direction of arrow C, such as by pivoting about the shaft 160, until the aforementioned high-friction or "biting" effect is achieved.

The lock collar 158 of the frame extension assembly 126 may be locked in any desired position (for example, any one of the positions of FIGS. 7-9) along the second frame member 114 of the device frame 102, and may be unlocked for further sliding. By means of this locking and unlocking of the lock collar 158, downward pivoting of the lever 128 beyond the maximum tension (or length) of the elongated flexible element 160 is prevented or allowed, respectively.

In an illustrative method of operation, the leveling device 100 may be deployed in place between a floor or other support surface 176 and an elevated structural member 178 to be raised, leveled, or stabilized. The frame base 110 may be placed on the support surface 176, and the upper end 118 of the second frame member 114 of the device frame 102 may be placed beneath the structural member 178. The lever 128, lock collar 158 and second frame member 114 may be initially arranged in a relatively lower position.

The lever 128 of the frame extension assembly 126 may be deployed from the lower position illustrated in FIG. 7 to the higher position illustrated in FIG. 9 to extend the second frame member 114 upwardly with respect to the first frame member 104 of the device frame 102 and thus with respect to the support surface 176. The lever 128 may pivot relative to the first frame member 104 about the first pivot fastener 150. As the lever 128 pivots upward, the lever 128 pushes and raises the second frame member 114. As the second frame member 114 is raised, the second frame member 114 pivots about the second rotation axis defined by the second pivot fastener 152. By rising the second frame member 114, the separation between the upper end 118 of the second frame member 114 and the support surface 176 (i.e., the length of the device frame 102) may be adjusted, allowing the upper end 118 to engage and raise, level, or stabilize the structural member 178 relative to the support surface 176. In some embodiments, a pivoting or shifting of the device frame 102 about or along the ground surface 176, respectively, may be facilitated by the generally planar and transverse frame base 110 resting on the ground surface 176 along a generally narrow, transverse contact surface or edge.

After the device frame 102 has lifted or raised the structural member 178 to the desired height, the frame lock 156 may be deployed to lock the device frame 102 at the selected extended length. This may be accomplished by initially unlocking the lock collar 158, as illustrated in FIG. 5, then sliding the lock collar 158 upward along the second frame member 114, and then releasing the lever 128, allowing the weight of the lever 128 to pull downwardly on the elongated flexible element 166 such that the elongated flexible element 166 stretches and becomes taut between the lever 128 and the lock collar 158. As illustrated in FIG. 6, the elongated flexible element 166 may pull downwardly on the lock collar 158 at the second flange 162 to shift the vertical position of the lock collar 158 on the second frame member 114. This tilting action of the lock collar 158 causes the second frame member 114 to become tightly engaged between the shaft 160 and the lock collar 158, thus locking the lever 128, and thus, the second frame member 114 at the selected height.

Removal of the leveling device 100 may be accomplished by raising the lever 128 to slacken the elongated flexible element 166 between the lock collar 158 and the lever 128. This action facilitates straightening of the lock collar 158 on the second frame member 114 (e.g., pivoting the lock collar 158 in the direction of arrow A shown in FIG. 5) such that the lock collar 158 can freely traverse or slide along the second frame member 114. The second frame member 114 can thus be lowered as the lever 128 pivots downwardly via the first pivot fastener 150 and the second pivot fastener 152.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A leveling device selectively deployable and actuatable to raise, lift, or stabilize a structural member with respect to a support surface, comprising:
    a device frame, comprising a first frame member and a second frame member, the second frame member slidably and adjustably overlapping with the first frame member such that a protruding portion of the second frame member extends beyond the first frame member, the device frame selectively extendable to various lengths by adjusting an overlap between the first and second frame members to vary a length of the protruding portion;
    a lever-actuated, frame extension assembly operably engaging the first frame member and the second frame member of the device frame, the frame extension assembly configured to facilitate selective adjustment of the overlap between the first and second frame members of the device frame to adjust the length of the protruding portion and thereby adjust the device frame to a selected extended length; and
    a frame lock configured to lock the device frame at the selected extended length, wherein the frame lock comprises a lock collar and an elongated flexible element, wherein the lock collar is slidable over and along the protruding portion of the second frame member, and further wherein the elongated flexible element extends from the lock collar to the frame extension assembly; wherein
    the frame extension assembly comprises a lever, wherein the lever is pivotably connected to the first and second frame members about first and second pivot points defining first and second rotation axes, respectively, the second rotation axis spaced apart from and parallel to the first rotation axis, wherein the elongated flexible element extends from the lock collar to the lever, wherein the second frame member is slidable relative to the first frame member responsively to a pivoting of the lever about the first rotation axis; and further wherein the leveling device is configured to selectively adopt:
        an unlocked configuration, in which the lock collar is arranged in a first position relative to the second frame member such that the lock collar is slidable along the second frame member, and further in which the lever is pivoted to a raised position and the elongated flexible element is non-taut, and
        a locked configuration, in which the lock collar is arranged in a second position relative to the second frame member such that the lock collar frictions against and is non-slidable relative to the second frame member, and further in which the elongated flexible element is taut, and the lever is pivoted to a lowered position relative to the raised position and is maintained in the lowered position by the taut, flexible element pulling on the lever and counteracting the force of gravity exerted on the lever.

2. The leveling device of claim 1, wherein the first and second frame members are elongately formed and straight.

3. The leveling device of claim 1, wherein the lever comprises a handle, and further wherein the second rotation axis is arranged between the handle and the first rotation axis.

4. The leveling device of claim 1, wherein the lever is length-adjustable.

5. The leveling device of claim 1, further comprising a bracket affixed to the first frame member at an end of the first frame member from which the second frame member protrudes, the bracket configured to retain the second frame member adjacent and slidable relative to the first frame member.

6. The leveling device of claim 5, wherein the bracket comprises a fastener arranged in spaced-apart configuration with the first frame member, wherein the second frame member is slidably received between the fastener and the first frame member.

7. The leveling device of claim 1, wherein, with the elongated flexible member non-taut, the lock collar is manually movable from the second position to the first position.

8. The leveling device of claim 1, wherein the lever is movable from the lowered position to the raised position by manually operating the lever.

9. The leveling device of claim 1, further comprising a bracket affixed to the first frame member and located between the first rotation axis and the lock collar, the bracket configured to retain the second frame member adjacent and slidable relative to the first frame member.

10. The leveling device of claim 1, wherein the lock collar is pivotable relative to the second frame member and positionable in the second position by a torque applied on the lock collar by a pulling of the elongated flexible element on the lock collar.

11. The leveling device of claim 10, wherein the lock collar comprises a shaft extending therethrough generally transverse to the second frame member, and further wherein the second frame member slidably extends through the lock collar on a first side of the shaft, and the elongated flexible element is connected to and configured to pull on the lock collar at a second side of the shaft opposite the first side, and further wherein the lock collar is pivotable relative to the second frame member about the shaft.

12. The leveling device of claim 11, wherein, in the locked configuration, an inner side of the lock collar bites into an outer side of the second frame member.

13. The leveling device of claim 12, wherein, in the unlocked configuration, the inner side of the lock collar is arranged generally parallel to the outer side of the second frame member.

14. The leveling device of claim 1, further comprising a frame base configured to support the first frame member on the support surface.

15. A leveling device selectively deployable and actuatable to raise, lift, or stabilize a structural member with respect to a support surface, comprising:
  a device frame, comprising a first frame member and a second frame member, the second frame member slidably and adjustably overlapping with the first frame member such that a protruding portion of the second frame member extends beyond the first frame member, the device frame selectively extendable to various lengths by adjusting an overlap between the first and second frame members to vary a length of the protruding portion;
  a frame extension assembly comprising a lever, the lever pivotably connected to the first and second frame members of the device frame about first and second pivot points defining first and second rotation axes, respectively, the second rotation axis spaced apart from and parallel to the first rotation axis, wherein the second frame member is slidable relative to the first frame member responsively to a pivoting of the lever about the first rotation axis facilitating selective adjustment of the overlap between the first and second frame members of the device frame to adjust the length of the protruding portion and thereby adjust the device frame to a selected extended length; and
  a frame lock configured to lock the device frame at the selected extended length, the frame lock comprising a lock collar and an elongated flexible element, wherein the lock collar is slidable over and along the protruding portion of the second frame member, and further wherein the elongated flexible element extends from the lock collar to the lever of the frame extension assembly; wherein
  the leveling device is configured to selectively adopt:
    an unlocked configuration, in which the lever is arranged in a raised position, and the lock collar is arranged in a first position relative to the second frame member such that the lock collar is slidable along the second frame member, and further in which the elongated flexible element is non-taut, and
    a locked configuration, in which the lever is arranged in a lowered position, and the lock collar is arranged in a second position relative to the second frame member such that the lock collar frictions against and is non-slidable relative to the second frame member, and further in which the elongated flexible element is taut, and the lever is maintained in the lowered position by the taut, elongated flexible element pulling on the lever and counteracting the force of gravity exerted on the lever; wherein
  the lever is manually pivotable upward from the locked configuration to relax the elongated flexible element enabling manual shifting of the lock collar from the second position to the first position to switch the level device from the locked configuration to the unlocked configuration.

16. A leveling device selectively deployable and actuatable to raise, lift, or stabilize a structural member with respect to a support surface, comprising:
  a device frame, comprising a first frame member and a second frame member, the second frame member slidably and adjustably overlapping with the first frame member such that a protruding portion of the second frame member extends beyond the first frame member, the device frame selectively extendable to various lengths by adjusting an overlap between the first and second frame members to vary a length of the protruding portion;
  a lever-actuated, frame extension assembly operably engaging the first frame member and the second frame member of the device frame, the frame extension assembly configured to facilitate selective adjustment of the overlap between the first and second frame members of the device frame to adjust the length of the protruding portion and thereby adjust the device frame to a selected extended length;
  a frame lock configured to lock the device frame at the selected extended length, wherein the frame lock comprises a lock collar and an elongated flexible element, wherein the lock collar is slidable over and along the protruding portion of the second frame member, and further wherein the elongated flexible element extends from the lock collar to the frame extension assembly; and a bracket affixed to the first frame member and located between the first rotation axis and the lock collar, the bracket configured to retain the second frame member adjacent and slidable relative to the first frame member; wherein the frame extension assembly comprises a lever, wherein the lever is pivotably connected to the first and second frame members about first and second pivot points defining first and second rotation axes, respectively, the second rotation axis spaced apart from and parallel to the first rotation axis, wherein the elongated flexible element extends from the lock collar to the lever, wherein the second frame member is slidable relative to the first frame member responsively to a pivoting of the lever about the first rotation axis; and further wherein the leveling device is configured to selectively adopt:
an unlocked configuration, in which the lock collar is arranged in a first position relative to the second frame member such that the lock collar is slidable along the second frame member, and further in which the elongated flexible element is non-taut, and
a locked configuration, in which the lock collar is arranged in a second position relative to the second frame member such that the lock collar frictions against and is non-slidable relative to the second frame member, and further in which the elongated flexible element is taut.

17. A leveling device selectively deployable and actuatable to raise, lift, or stabilize a structural member with respect to a support surface, comprising:

a device frame, comprising a first frame member and a second frame member, the second frame member slidably and adjustably overlapping with the first frame member such that a protruding portion of the second frame member extends beyond the first frame member, the device frame selectively extendable to various lengths by adjusting an overlap between the first and second frame members to vary a length of the protruding portion;

a bracket affixed to the first frame member at an end of the first frame member from which the second frame member protrudes, the bracket configured to retain the second frame member adjacent and slidable relative to the first frame member, wherein the bracket comprises a fastener arranged in spaced-apart configuration with the first frame member, wherein the second frame member is slidably received between the fastener and the first frame member;

a lever-actuated, frame extension assembly operably engaging the first frame member and the second frame member of the device frame, the frame extension assembly configured to facilitate selective adjustment of the overlap between the first and second frame members of the device frame to adjust the length of the protruding portion and thereby adjust the device frame to a selected extended length, and a frame lock configured to lock the device frame at the selected extended length.

\* \* \* \* \*